United States Patent [19]

Peters

[11] Patent Number: 4,521,435

[45] Date of Patent: Jun. 4, 1985

[54] HAMBURGER-TYPE MEAT PATTIES

[76] Inventor: Leo Peters, 750 Plymouth Rd., SE., Grand Rapids, Mich. 49506

[21] Appl. No.: 472,108

[22] Filed: Mar. 4, 1983

Related U.S. Application Data

[63] Continuation-in-part of Ser. No. 221,896, Dec. 31, 1980, abandoned.

[51] Int. Cl.³ .............................................. A23L 1/31
[52] U.S. Cl. ..................................... 426/92; 426/302; 426/307; 426/646; 426/653; 426/513
[58] Field of Search ............... 426/92, 289, 290, 292, 426/293, 295, 296, 652, 646, 513, 302, 307; 17/32

[56] References Cited

U.S. PATENT DOCUMENTS

| | | | |
|---|---|---|---|
| 1,785,797 | 12/1930 | Watson | 17/32 |
| 1,896,313 | 2/1933 | Hubbell et al. | 17/32 |
| 3,026,562 | 3/1962 | Bania | 17/32 |
| 3,078,172 | 2/1963 | Libby | 426/293 X |
| 3,169,069 | 2/1965 | Hanson et al. | 426/296 X |
| 3,792,173 | 2/1974 | Glabe | 426/92 |
| 4,071,635 | 1/1978 | Lindl et al. | 426/652 X |
| 4,208,442 | 6/1980 | Evans et al. | 426/92 X |
| 4,260,637 | 4/1981 | Rispoli et al. | 426/293 X |

FOREIGN PATENT DOCUMENTS 48-32662 8/1973 Japan ..................................... 426/92

*Primary Examiner*—Robert Yoncoskie

[57] ABSTRACT

There is disclosed methods for reducing the weight loss of a hamburger-type meat patty by applying to said meat patty a juice retaining coating. The coating contains at least 30% by weight dry powdered egg whites.

13 Claims, 16 Drawing Figures

HAMBURGER-TYPE MEAT PATTIES

RELATED APPLICATION

This application is a continuation-in-part of my prior application Ser. No. 221,896 filed Dec. 31, 1980, now abandoned.

DEFINITIONS AND LIMITATIONS

Hamburger-type meat patties applies herein to all meat that is chunked or ground, and formed, having thicknesses in the range of ⅛ to 1-inch.

All temperatures used herein are on the Fahrenheit scale.

The exemplary hamburger patty used throughout this disclosure is the popular quarter-pound size; a patty that weighs 4-oz. at raw weight, and is about 4¾-inches in diameter and ⅜-inches thick, and has a 20% fat content.

The description will be oriented to hamburger cookery as practiced by the large chain-restaurant fast-food operators, with the understanding it also applies to home-cooking.

UNDERSTANDING THE PROBLEM

The general overall problem involves juice-weight losses in the range of 25% to 40% in both commercial and domestic cooked hamburgers.

This problem involves eight individual problems whose solutions are the objectives and discoveries of this invention. This invention is also concerned with the special operational problems of speed, simplicity, and uniform quality in fast-food hamburger restaurants.

The solutions for all the problems are interdependent on the solutions of each.

DESCRIPTION OF OBJECTIVES AND DISCOVERIES

Objective No. 1: Substantially reducing weight-loss in cooked hamburger patties with a coating that (1) seals in the juice; (2) is invisible on, and (3) inseparable from, the surfaces of said patties.

This objective is accomplished with a coating that has nineteen exemplary functional requirements as follows:

1. An edible, moisture-absorbing-and-holding substance that at room temperatures
2. Completely coats, covers, and/or envelopes a hamburger patty whose surfaces are wet or awash with excreted juices, and
3. Absorbs said juice, and thereby
4. Forms a damp relatively juice-filled matted web that
5. Stops, impedes, and immobilizes the free surface movement of said juice and
6. Clings to the patty despite the wet interface; and
7. Coheres to itself with a self-bonding continuity that forms a relatively impermeable barrier to the free out-passage of excretable juice, and thus
8. Stanches, stops, contains, or otherwise prevents the loss of juice from said patty.
9. Adheres and anchors itself to the patty body while it
10. Fries on a griddle at about 375°+, thereby causing said juice-dampened web to:
11. Caramelize, homogenize, and/or knit together with itself and on to the juice-laden meat surfaces of said patty; and
12. Bond so tightly on to the meat of said fried patty surfaces that it loses its own identity by becoming texturally invisible and/or indistinguishable; and
13. Inseparable from said patty meat to the degree that it prevents being brushed, scraped, lifted, or pried loose, or away, from the meat itself without also taking meat with it; whereby it also serves to
14. Increase substantially the after-frying retentiontime of internal cooked meat, and
15. Stiffen and strengthen the patty body, yet serves to
16. Keep it flexible, without breaking, during subsequent handling into a bun, and
17. Not adhere to, but release clean from the griddle's metal surfaces and thereby also
18. Produce a firm but not hard, chewable without being rubbery, easy to masticate but not soft, juice-filled but not mushy hamburger body; and finally
19. Present a golden, glistening, appetizing-looking and tasting surface for said patty that will remain intact and crisp-surfaced within a bun during the time usually required to eat it.

This ideal list of "functional requirements" for a juice-sealing coating has been achieved in this invention with various combinations of various edible materials. For example:

Types of edible materials that can be combined to fulfill the functional requirements for a juice-sealing coating on a hamburger patty; with an example of a specific material for each.

1. Hygroscopic materials to absorb juices excreting from said patty. Example: cereal starches.
2. Cohesive (self-bonding) materials to form a continuous substantially juice impermeable web that seals juices within a hamburger patty structure; juice that otherwise would excrete and be lost during frying. Example: dried powdered egg whites.
3. Adhesive materials that by hygroscopic action, can stick, cling, adhere to, and suck themselves into, the surfaces of my juice-awash, adhesive-repellant, hamburger surfaces; and then during cooking, firmly anchor and bond my coating to, and prevent it from popping off said surfaces; thus assisting said cohesive materials to seal said juice within the patty-meat itself. Example: wheat flour; especially the flour of durum wheat for its collusive glutinous quality.
4. Metal release materials that during griddle-frying provide quick, easy, and clean release of the fried coated hamburger from the hot griddle surface. Example: Hydrogenated vegetable oils.
5. Granular, non-adhesive, non-cohesive, and relatively non-hygroscopic materials that assist in the functions of dusting, rubbing, and etching for applying the coating onto the juice-excreted surfaces of the patty. Example: Corn meal of 400 to 1600 micro-meter sizes.
6. Coloring materials of largely, but not necessarily entirely, non-red colors, preferably white or light brown, that contrast with and distinguish the coating from the red colors of the surface juices of said patty before cooking until such materials have become hygroscopically absorbed into said juices and thereby changing color to become visibly color-blended, mated, and matched with and into said red colors, thereby also indicating complete absorption of the coating onto and/or into said patty's surfaces.

All the materials listed as examples herein are white or of light shades of gray or brown.

7. Flavoring materials for any desired enhancement and/or addition to the natural flavor of my cooked hamburger. Example: Monosodium glutamate salt for its compatibility with meat flavors.
8. Anti-caking materials that render all materials in my coating substance free-flowing to facilitate an even-layered application of the coating to a hamburger surface. Example: Fumed silica.

All materials in dry-pulverized, and/or finely granulated form so that can be (a) evenly mixed and blended together into (b) a flour-like substance of free-flowable-at-gravity consistency and thereby (c) applied to my wet hamburger surfaces by such actions as sifting, dusting, blowing, dredging, rubbing, contacting, or any other standard method and means used for applying and covering dry coating substances to and on food products. All of the above materials blended into a dry flour-like homogeneous mixture.

It will be understood that some of the foods used above as examples for materials having particular functional properties, may also have some of my other required coating functional properties.

The protein egg white is a case in point. Because its multi-functional performances within my coatings are more precisely reliable for my objectives than some of the starches or other proteins, I prefer to use it as a major ingredient in my coating formulas. However, it will be understood that my coating ingredient formulas may vary widely provided they always perform at least the three claimed functions of (1) sealing in juice and being (2) invisible on and (3) inseparable from the cooked patty meat.

Immediately following is a detailed exemplary formulation of a preferred coating substance of seventeen ingredients using dry powdered egg whites to carry the major multi-functional load for coated hamburgers:

| An Exemplary Coating Formula | | |
|---|---|---|
| Percent | by | Weight of |
| 50.0 | — | Dry powdered non-foaming egg whites. |
| 10.0 | — | Baked leavened wheat crumbs; comprising bleached wheat flour, salt, yeast, spice extractive. |
| 8.0 | — | Partially hydrogenated vegetable oil; may contain one or more of the following oils; soybean, cottonseed, palm, corn. |
| 8.0 | — | Enriched unbleached durum wheat flour; with niacin, iron, thiamine, mononitrate, riboflavin. |
| 7.0 | — | Malted cereal. |
| 2.0 | — | Salt. |
| 2.0 | — | Autolyzed yeast. |
| 2.0 | — | Sugar. |
| 2.0 | — | Hydrolyzed plant protein. |
| 2.0 | — | Monosodium glutamate. |
| 2.0 | — | Beef extract. |
| 1.0 | — | Corn meal. |
| 1.0 | — | Dextrose. |
| 1.0 | — | Onion powder |
| 1.0 | — | Extractive of paprika. |
| 0.5 | — | Artificial roast beef flavor. |
| 0.5 | — | Fumed silica. |
| 100.0% | | |

The above formulation is preferred by me for coating hamburger patties made from beef or veal. But for patties made from pork, lamb, or poultry I would use flavoring ingredients most compatible with, and complementary to, these particular meats.

Using my preceding preferred 17-item-coating-ingredients as the control formula, Item 5 in the Comparison Table No. I below shows the preferred result from using this formula. The 16 non-egg white items of the control formula are increased or decreased to the same relative percentages they occupied in the control formula, as the percentage of egg whites is increaased or decreased in six additional exemplary formulas shown in items 2, 3, 4, 6, 7, and 8.

TABLE NO. I

Comparison of Juice and Coating Weight Losses from Various Percentages of Adhesive-Cohesive Ingredient in Coating Formulas
(weights in ounces)

| | Coating Formula | BEFORE FRYING | | Wt. Fried | AFTER FRYING | | Loss | |
|---|---|---|---|---|---|---|---|---|
| | | | | | Loose Coating and Juice Scraped Off | Net Fried Meat Weight | | |
| Item | Identity | Wt. Raw | Wt. Coated | | | | Wt. | % |
| 1. | 100% egg whites | 4.1 | 4.2 | 2.9 | 0.2 | 3.1 | 1.1 | 26.2 |
| 2. | 80% egg whites | 4.1 | 4.3 | 3.9 | 0.1 | 3.8 | 0.5 | 11.6 |
| 3. | 70% egg whites | 4.1 | 4.3 | 4.0 | 0 | 4.0 | 0.3 | 7.0 |
| 4. | 60% egg whites | 4.1 | 4.3 | 4.1 | 0 | 4.1 | 0.2 | 4.6 |
| 5. | 50% egg whites | 4.0 | 4.3 | 4.1 | 0 | 4.1 | 0.2 | 4.6 |
| 6. | 40% egg whites | 4.1 | 4.3 | 4.0 | 0 | 4.0 | 0.3 | 6.8 |
| 7. | 30% egg whites | 4.2 | 4.4 | 4.1 | 0 | 4.1 | 0.3 | 6.8 |
| 8. | 20% egg whites | 4.2 | 4.4 | 4.0 | 0 | 4.0 | 0.4 | 9.0 |
| 9. | 25% egg whites 12.5% corn starch 12.5% potato starch | 4.2 | 4.4 | 4.1 | 0.3 | 3.8 | 0.6 | 13.6 |
| 10. | 25% corn starch 25% potato starch (No egg whites) | 4.2 | 4.4 | 4.0 | 0.6 | 3.4 | 1.0 | 22.7 |
| 11. | No egg whites | 4.0 | 4.3 | 3.4 | 0.3 | 3.1 | 1.2 | 27.9 |

Some significant facts demonstrated in the preceding table are these:

(1) The coating formulas within the border surrounding Items 2 through 9 all produce cooking-weight-reduction percentages within the preferred Objectives of this invention; i.e., all produce juice-weight losses under 14% compared with all of the prior-art losses which range between 29.3% and 40% (See Table II, Col. 10).

(2) The critical need to reach an in-combination balance between all the ingredients of a coating formula (e.g., one major egg white ingredient, or its equivalent, and 16-minor ingredients) if it is to fulfill all the Objectives of this invention and qualify for both my preferred and exemplary coating formulas. Objective No. 2: Keeping the buns that encase a cooked hamburger relatively dry; i.e., keeping them from becoming juice-soaked and soggy under the conditions experienced in the commercial market.

This objective is automatically achieved with the achievement of my first objective.

Objective No. 3: Eliminating the formation of polyps on the surfaces of hamburger patties during cooking achieved by means of see-through holes.

Polyps are heat-produced inflammed membranes (soft spongy tissues) that exude to the surfaces of cooking hamburgers under pressure from heat-produced expansions of interior cellular juices.

They are visible evidence of weak, or relatively open, points where heat penetrates into the mass easiest and quickest.

From these phenomena followed by discovery that when see-through holes are pierced through the flat sides of the patty mass, before said patty is coated, with sizes and frequencies to cover practically the entire range of any and all polyp formations, said holes will then, during the cooking of said patty, provide immediate interior, opened, protected, and uniformly spaced apart areas into which the heat-induced inflammed tissues can expand and be held, and thus prevent their expansions onto the outer unprotected surfaces where they would be crushed, vaporized, burnt, and their weight along with juice-weight, be lost.

The sizes, numbers, and spacings of holes are of critical importance in preventing juice loss. They are of a size that will serve as collecting stations to attract by means of capillary action and hold by means of hydrostatic tension, the juice that purges out of the raw patty during processing, storage, and cooking.

To perform these specific functions, my holes must have specific dimensions.

Using my exemplary ¼-lb. patty, I have found that the following range in specifications provide exemplary results in achieving the several objectives of this invention.

Original hole diameter or width: 1/16 to 3/16-inch.
Residual hole diameter or width: 1/32 to 3/32-inch.
The particular configurations of the holes is not important.

Objective No. 4: This is a dual objective: (1) Producing the brown-gray interior color of fast-food cooked hamburgers and (2) reducing to specific percentages a hamburger's juice losses.

The interior color of cooked beef is controlled by the internal level of heat in the cooked product. Also, the lower the internal doneness temperature level is, the lower will be the juice loss, but the longer the cooking time.

Fast-food hamburger operators would like to lower their 30% to 40% juice loss but to do this they would not only have to increase their cooking time to the point of losing their "fast-food" image, but also the resulting product would take on the internal reddish colors of rare to medium meat having internal temperatures in the 130° to 150° range.

To be on the safe side with all their customers, the fast-food operators simply make all their hamburgers well-done with a brown-gray color, and live with their high juice losses.

Objective No. 4 is the result of accomplishing the preceding Objectives. It changes the prior-art relationship between cooking time, heat, juice-loss, and interior color.

With my invention a quarter-pound hamburger patty can be fried at 375° for only 3-minutes and achieve the "impossible" result of a patty that has a brown interior color and a juice-weight loss in my exemplary hole-and-coated patty of only about %5 and in my coated-only patty of about 7%.

Objective No. 5: Eliminating physical distortions during cooking.

This problem is not to be confused with shrinkage in size. It can occur even when there is virtually no shrinkage in size. It evidences itself as internal puffed-up and/or blown-up, and/or curled up edges that occur during the cooking process.

They are undesirable because they produce (1) large pockets of juice that pop open during cooking and/or eating, and flood out in undesirable concentrations producing dripping hamburgers, excessive juice loss and/or soggy buns; (2) alternating raw and well-done areas; (3) irregular peripheral configurations that do not conform to the periphery of the bun; and (4) bumpy areas within the bun.

In the prior art these distortions are prevented only by spatula pressure from the fry-cook.

Thus again by eliminating the formations of polyps with the achievement of my Objective No. 3 I now also eliminated the physical distortions of the present Objective No. 5.

Objective No. 6: Reducing the rate of heat-loss after cooking; i.e., increasing the saleable shelf-life of a cooked hamburger.

Achievement of this Objective was fortuitously accomplished by the "juice-sealing coating" of Objective No. 1; said coating functioning as insulation against the free and unobstructed loss of after-cooking heat which takes place at the surfaces of prior-art hamburgers.

The following table is a typical example of the accomplishment of this objective.

| Elapsed holding time | Approximate "shelf-life" temperatures of: | |
|---|---|---|
| | The leading prior-art fast-food hamburgers after 4.5-minute griddle-frying @ 375°+ from a 40° start | Hamburgers this invention after 3.0-minute griddle-frying at 375°+ from a 40° start |
| at start - zero | 140° | 145° |
| 5-minutes | 125° | 135° |
| 10-minutes | 115° | 125° |
| 15-minutes | 110° | 120° |
| 20-minutes | 105° | 115° |

The critical commercial consideration is the expiration time for a 115° minimum edible acceptability. For the prior-art hamburger this expiration time was at 10-minutes, while for my new hamburgers it was 20-minutes. Thus the acceptable "shelf-life" for my hamburgers is approximately double the time span of the leading prior-art comparably cooked fast-food hamburgers.

Objective No. 7: Increasing the speed of fry time by reducing it from 4.5 to 3-minutes; a 33⅓% increase in speed.

The holes of my invention achieved this Objective; with a fry time of 1½ minutes on each side.

Objective No. 8: To achieve all the preceding Objectives despite the "obvious impossibilities" of doing so because some of them are apparently mutually-defeating propositions.

This invention has achieved all its objectives singly and in-combination.

SUMMARY COMPARISON OF OPERATING RESULTS

Having described the methods and means for achieving my objectives, I present the following summary table showing exemplary operating results from the use of my invention compared with leading patented and non-patented prior-art hamburger patties.

structured in accordance with customary prior-art practices without the addition of my pierced holes.

The second embodiment (FIGS. 5 through 8-A) has holes pierced through the thickness of a hamburger patty, and the description shows the action and effect that these holes and my coating have on and within said patty.

DESCRIPTION OF THE DRAWINGS

The two exemplary embodiments are illustrated in full scale in the accompanying drawings, based on the exemplary hamburger of this application in which:

FIG. 1 is a cross-section view of a raw hamburger patty without either see-through holes, or a coating, taken along line 1—1 of FIG. 1-A.

FIG. 1-A is a top plan view of the patty of FIG. 1.

TABLE NO. II

OPERATING RESULTS COMPARED WITH PRIOR-ART

| | COOKING SPECIFICATIONS | | | | | | COOKED RESULTS | | | | | |
|---|---|---|---|---|---|---|---|---|---|---|---|---|
| (1) Patty Identity | (2) Cook Method | (3) Aprox. Cook Temp | (4) Time (Minutes) | (5) Spatula Pressure to Prevent Distortion | (6) % fat in meat | (7) Raw net wt. incl. coating (oz.) | (8) Cooked Net wt (oz.) | (9) Juice + Coating Weight Loss Oz | (10) % of raw | (11) Interior Color | (12) Adhesion of Coating to meat | (13) Mouth Bite-Feel |
| SECTION A - Two Exemplary Prior-Art Coated Patty Patents Claiming Low Juice Loss | | | | | | | | | | | | |
| Libby Patent No. 3,078,172 coated ¼pound | fry | 375°+ | 4.5 | required | 20 | 4.5 | 2.9 | 1.6 | 35.6 | pink-brown | None. It slides off. | firm and dry |
| Glabe Patent No. 3,792,173 coated ¼pound | fry | 375°+ | 4.5 | required | 20 | 4.5 | 3.1 | 1.4 | 31.1 | pink-brown | None. It peels off. | firm dry |
| SECTION B - Three Leading Prior-art Non-coated Non-patented Fast-food Patties | | | | | | | | | | | | |
| Wendy's ¼pound | fry | 375°+ | 4.5 | required | ? | 4.0 | 2.4 | 1.6 | 40.0 | gray-brown | No coat | hard and dry |
| Burger King Whopper ® | broil | 800° and up | 0.7 | required but unable | 20 | 3.7 | 2.6 | 1.1 | 29.7 | gray-brown | No coat | hard and dry |
| McDonald Quater-pounder | fry | 375°+ | 4.5 | required | 20 | 4.1 | 2.9 | 1.2 | 29.3 | gray-brown | No coat | hard and dry |
| SECTION C - Two Exemplary Applications of This Invention | | | | | | | | | | | | |
| Peter's 0.3 oz. coated ¼pound | fry | 375°+ | 4.5 | required | 20 | 4.3 | 4.0 | 0.3 | 7.0 | brown | Bonded tight | firm and juicy |
| Peters' holes 0.3 oz. coated ¼pound | fry | 375°+ | 3.0 | none | 20 | 4.3 | 4.1 | 0.2 | 4.7 | brown | Bonded tight | firm and juicy |

SUMMARY CONCLUSIONS FROM TABLES I AND II

The detailed results shown in these tables demonstrate that my coating has achieved the important new-art functions of (1) Substantially reducing weight-loss to a regular 5% for the holes-plus-coated patty and 7% for the non-distorting coated-alone patty, compared with 30% to 40% juice-weight loss in the three leading fast-food hamburgers; being (2) invisible on, and (3) inseparable from, the surfaces of a meat patty, while at the same time achieving all the other objectives of this invention.

DESCRIPTION OF TWO EXEMPLARY EMBODIMENTS

In the first embodiment (FIGS. 1 through 4-A) I describe my juice-sealing patty-preparation coating methods and means for hamburgers that have been

FIG. 2-A is a top plan view of the coating of FIG. 2, before the coating is absorbed into the patty's surfaces.

FIG. 3-A is a top plan view of the coating of FIG. 3.

FIG. 4-A is a top plan view of FIG. 4.

FIG. 5-A is a top plan view of the patty of FIG. 5.

FIG. 6 is a cross-section of a raw hamburger patty with both a coating and 1/16" diameter pierced see-through holes taken along line 6—6 of FIG. 6-A.

FIG. 6-A is a top plan view of the patty of FIG. 6.

FIG. 7-A is a top plan view of FIG. 7.

FIG. 8-A is a top plan view of FIG. 8.

1. A coated hamburger patty without holes: FIGS. 1 through 4-A

Figures 1, 1A:
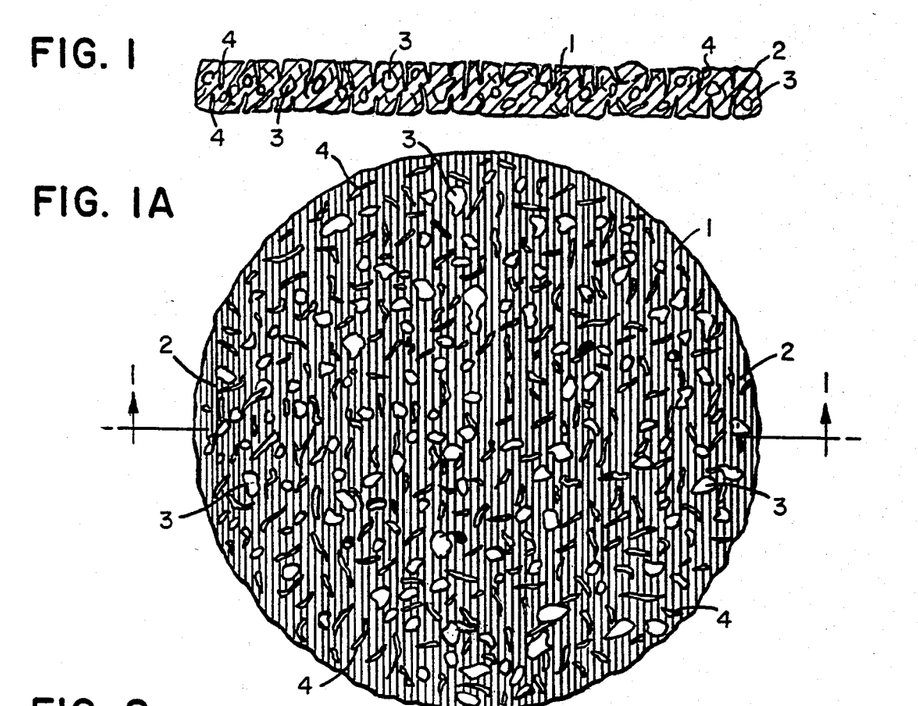

FIG. 1 and FIG. 1-A show a raw hamburger patty 1 having red meat 2, white fat 3, and many tiny cracks or opened areas 4, in enlarged perspective. These opened areas are fissures, crevices, and cracks throughout the body of a raw hamburger patty, naturally created by standard grinding procedures. They are not see-through type of openings that penetrate through the entire thickness of the patty.

Figure 2:
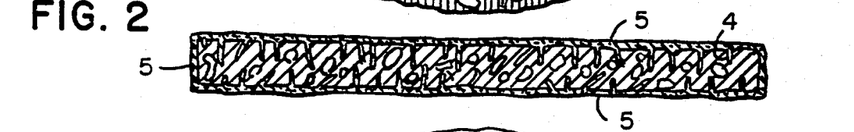
FIG. 2 is a cross-section view of a raw hamburger patty, with a coating but no see-through holes, taken along line 2—2 of FIG. 2-A.

FIGS. 2 and 2-A show my white or light colored powdered coating 5 on and across all outer surfaces, visibly obliterating the red-meat and yellow-fat surface shown in FIGS. 1 and 1-A.

Figure 2A:
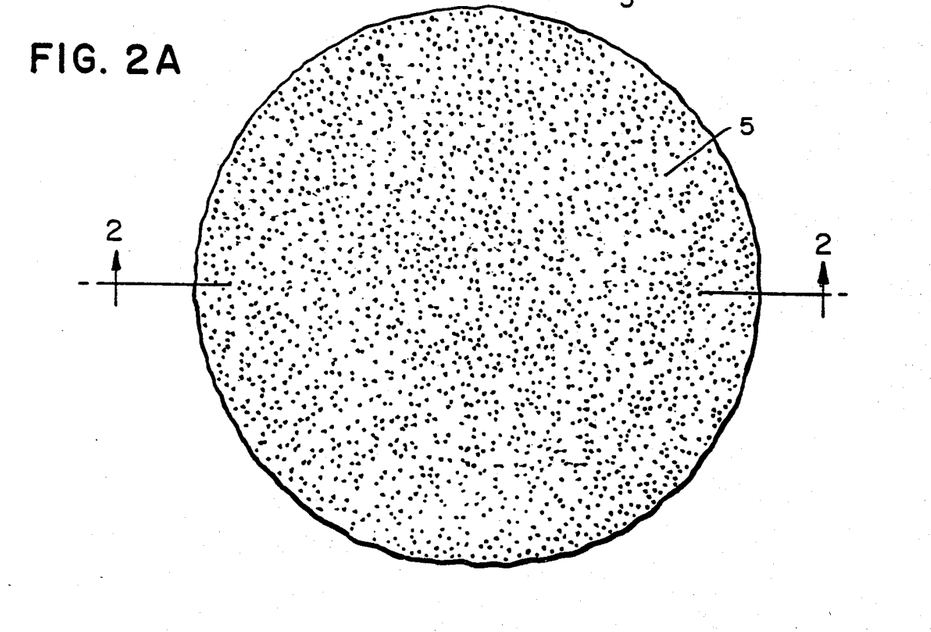

This showing of said coating is immediately after it has been dusted onto and into said patty's surfaces and opened areas; and before it has had time to be hygroscoptically abosrbed into, and by, the free juices lying on the outer surfaces and within the opened areas of said patty. For example, opened area 4 has not had time to absorb any of said dusted-on coating into its area below the surface of said patty.

The coating 5 is shown in exaggerated thickness in FIG. 2 on said outer surfaces of said patty. To perform its cohesive and adhesive functions, and thus also its juice-sealing, invisible, and inseparable functions, it need be no more than about 1/64-inch in thickness. Such a thickness will automatically be achieved if the coating is simply dusted on, and then the excess thickness (i.e., the amount not quickly matted into the juice) is shaken or lightly brushed off.

Figure 3:
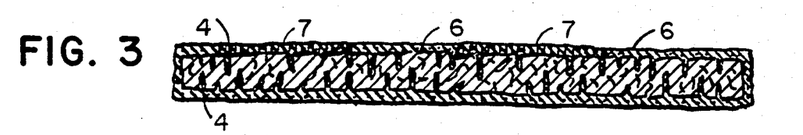
FIG. 3 is the same cross section as in FIG. 2 after its coating becomes absorbed by, and attached to, the patty's surfaces, taken along line 3—3 of FIG. 3-A.
Figure 3A:
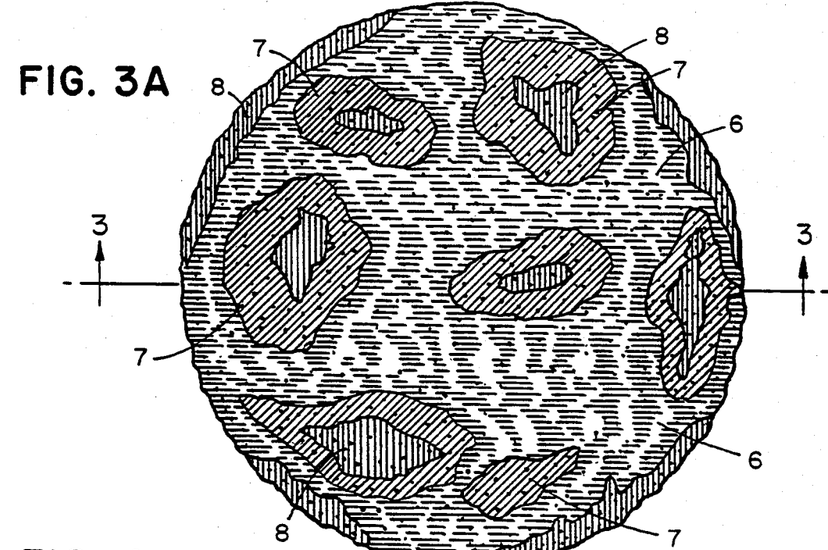

FIG. 3 and FIG. 3-A show said coating in the process of being hygroscopically absorbed by the free juice on the surfaces, and within said opened areas, of said patty. The cracks and opened areas 4 are substantially filled with juice-absorbed coating. Some large grayish or white areas 6 indicate the coating is still in the early stages of being absorbed into the red juice of the hamburger meat; some brown areas 7 indicate the middle stage of coating absorption into said red juices; and some smaller red 8 areas indicate the final stages of complete absorption of said coating into the red free juice of said patty's surfaces and opened areas.

When all the surfaces and opened areas of the coated hamburger have changed the light-colored coating into the red color of the hamburger juice, then the process of coating absorption is complete.

Figure 4:
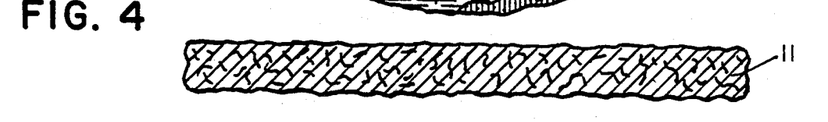
FIG. 4 is the same cross section as FIG. 3 after the patty has been griddle-fried, taken alone line 4—4 of FIG. 4-A.
Figure 4A:
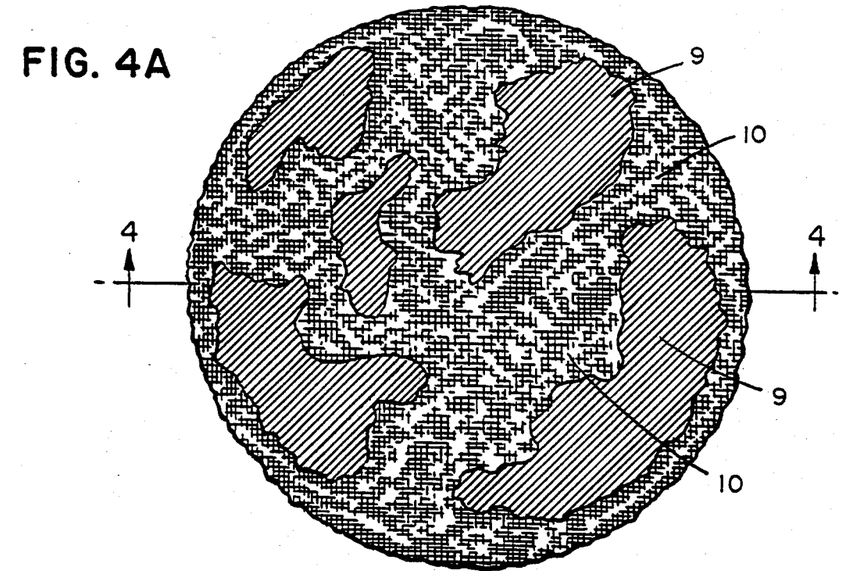

FIG. 4 and FIG. 4-A show the interior and exterior colors of my completely absorbed coating on said hamburgers after it has been fried. The flat surfaces show the brown colors 9 and golden-yellow colors 10, and interior brown colors 11, of hamburgers finish-fried to the best caramelized-surfaced colors and interior brown colors that the fast-food hamburger industry likes to have. Thus the coating actually is invisible; i.e., not visibly different from the best acceptable non-coated fried surfaces of the prior-art, nor visibly separate from the surface of the meat itself.

It will be noted from both FIGS. 4 and 4-A that the fried surfaces have completely filled, covered, and obliterated any opened areas, and that the fried coating has actually fused itself onto the surfaces of said patty. Thus (1) it is not visibly distinguishable in appearance from the surfaces of well-fried prior-art hamburgers, and (2) it is impossible to pry the coating off said patty without taking meat with it.

2. A coated hamburger patty with pierced see-through holes. FIGS. 5 through 8-A

Figure 5:
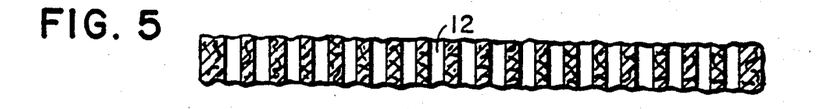
FIG. 5 is a cross-section of a raw hamburger patty with ⅛" diameter pierced see-through holes but no coating; taken along line 5—5 of FIG. 5-A.

In FIGS. 5 and 5-A I've purposely deleted illustrations of the white-fat and open areas illustrated in FIGS. 1 and 1-A. These areas are also within the patty of FIGS. 5 and 5-A, but if I illustrated them in the present drawings they would tend to obscure the see-through holes that are here clearly shown in number 12. The holes in these Figs. are shown in their original ⅛-inch diameter pierced diameters before my piercing needles have been withdrawn. After being withdrawn, the residual hole diameters are about 1/16 inch. The holes are spaced ¼-inch apart at centers and ⅛-inch at their circumferences, producing 248 holes in my 4¾-inch diameter ⅝-inch thick patty. The combined cubic space of these 248 ⅛-inch diameter holes equals 1.16 cubic inches, or 17% of the cubic 6.67 inch total cubic space of my exemplary patty.

Figures 5A, 6:
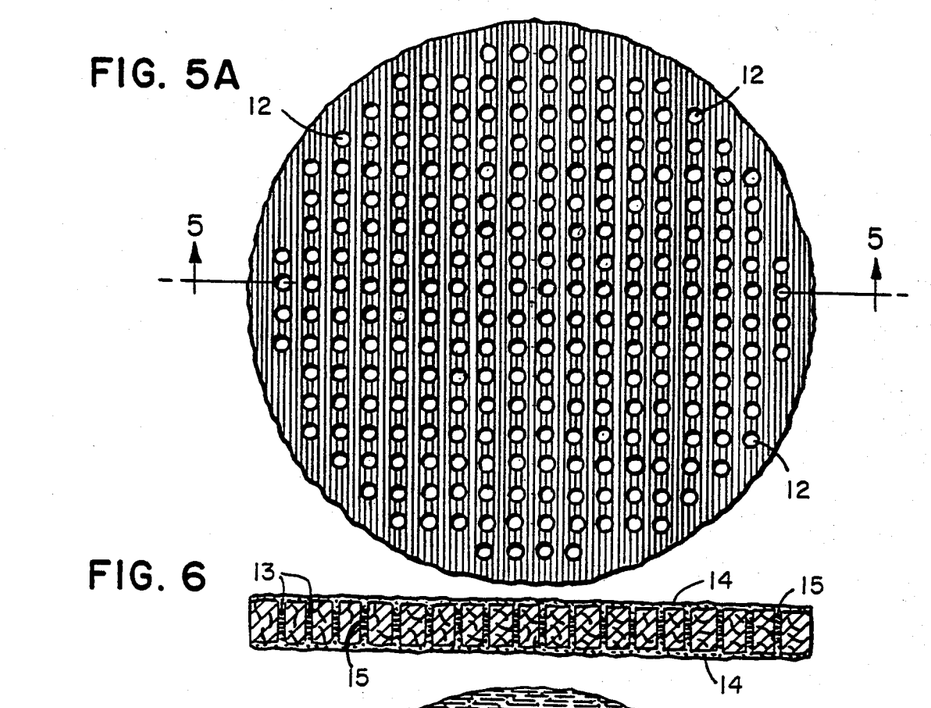

FIGS. 6 and 6-A illustrate my hole-pierced patty soon after the piercing needles have been withdrawn and my juice-sealing coating applied to the surfaces of said patty. These Figs. show the results of (1) the 50% contractions, from the ⅛-inch holes of FIGS. 5 and 5-A, to the new residual 1/16-inch holes 13; (2) the action of the coating 14 in relation to the holes; and (3) juice 15 excreted from the meat within said holes.

Figure 6A:
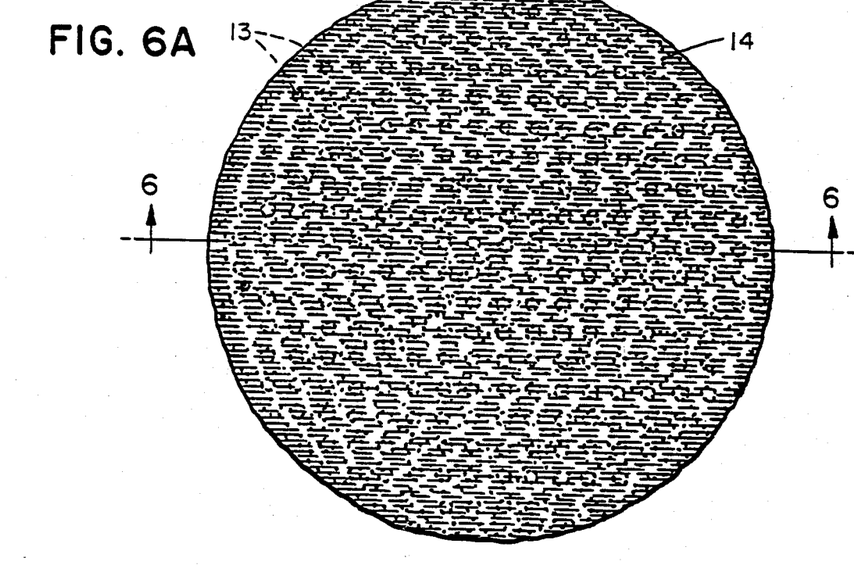

It will be noted that the squeezings, pressures, and compressions within the meat patty produced by expansions caused by the piercing needles has started juice 15 purging out of the meat-cells and collecting in the centers of the residual holes 13. At this time-stage in the preparation of my hole-pierced coated patty, the coating has not had time to react hygroscopically with said hole-collected juice. This is illustrated by numeral 14 showing the coating non-absorbed across the surfaces of said pierced-hole patty.

The coating itself is applied, and the excess has been brushed off as described above under FIG. 2.

Figure 7:
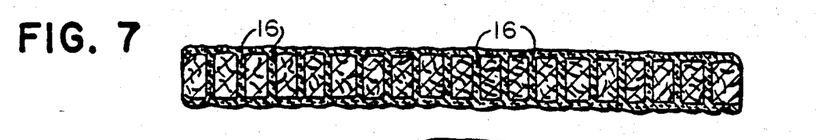
FIG. 7 is the same cross-section as FIG. 6 after its coating becomes absorbed by, and attached to, the patty's surfaces, taken along line 7—7 of FIG. 7-A.
Figure 7A:
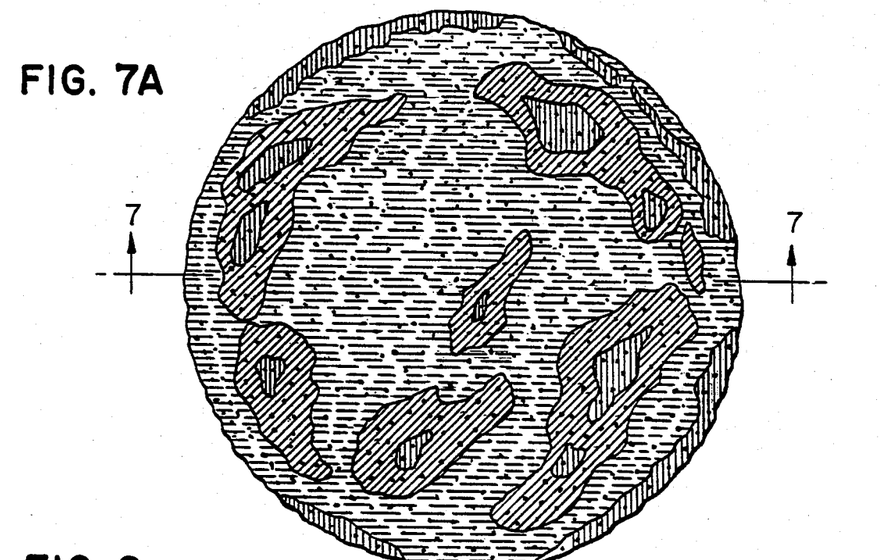

FIGS. 7 and 7-A show the same coating absorption process as described under FIGS. 3 and 3-A, with one exception, namely the contribution that pierced holes make to the functional advantages of my coating. The holes enable the coating to absorb surfacing juices on the interior surfaces of said holes to the extent that the holes themselves are clogged with juice-absorbed coating that obliterates exterior visibility of the holes themselves as shown at 16 in FIG. 7.

Figure 8:
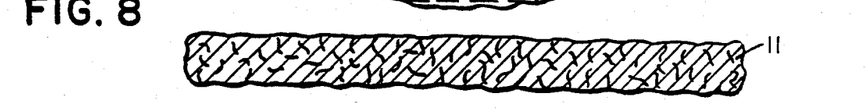
FIG. 8 is the same cross-section as FIG. 7 after the patty has been griddle-fried, taken along line 8—8 of FIG. 8-A.
Figure 8A:
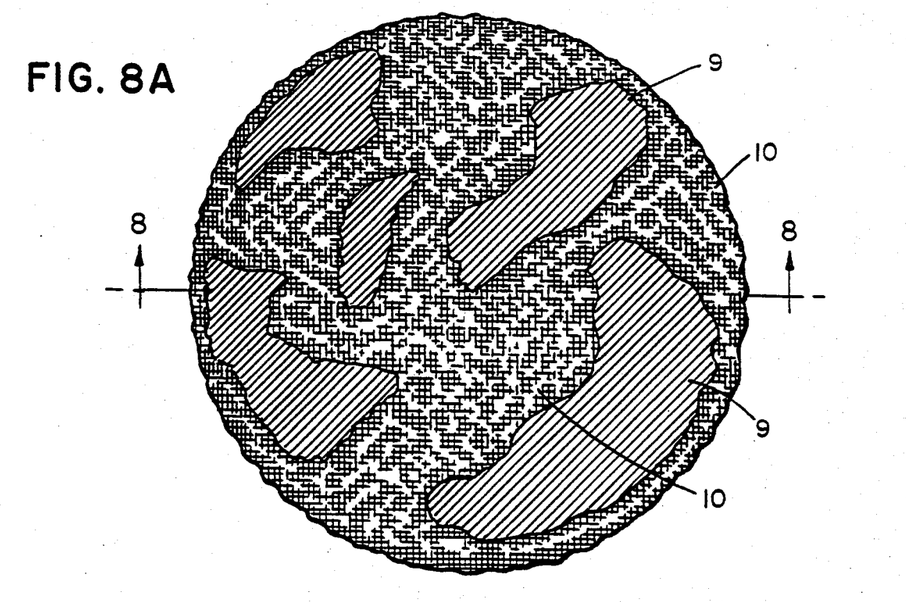

FIGS. 8 and 8-A are simply a repeat of the description given with FIGS. 4 and 4-A. But with the present Figs. it is noteworthy that the fried coating has fused itself onto the surface of the patty, and completely obliterated any visible evidence of the pierced holes. This is simply optical evidence that it is performing its three unique functions of sealing in juice, indistinguishability, and inseparability, from the meat itself.

I claim:

1. A fried hamburger-type meat patty, with a coating on said patty that seals in substantially all of said patty's original raw weight juice, said coating being invisible and inseparable from the meat of said patty and including at least 30% by weight dry powdered egg whites.

2. The patty of claim 1 in which said coating includes at least about 40% by weight dry powdered egg whites.

3. The patty of claim 1, in which said patty has a plurality of holes pierced through said patty's thickness dimension after the patty has been formed in its original raw state; the diameters or width of said holes having original measurements within the range of 1/16 to 3/16-inches and residual measurements of 1/32 to 3/32-inches.

4. The patty of claim 1, in which said patty has a plurality of holes pierced through said patty's thickness dimension after it has been formed in its raw state; said holes having residual diameters or widths small enough to hold free juices of said patty in hydrostatic tention.

5. The patty of claim 1 in which said coating includes about 40% to 60% by weight dry powdered egg whites.

6. The patty of claim 1 in which said coating includes about 50% by weight dry powdered egg whites.

7. The patty of claim 1 in which said coating further comprises in minor amounts cereal starch, flour, hydrogenated vegetable oil, and a granular corn meal for assisting in dusting or rubbing the coating onto the surface of the patty.

8. The patty of claim 2 in which the distance between the centers of adjacent holes is about ¼ inch to about ⅜ inch.

9. A coated raw hamburger patty having exterior surfaces which are wet with excreted juice, the coated patty having a coating covering the surface of the patty and comprising a dry powder-like edible substance dusted onto and into said excreted juice and transformed by hygroscopic action between said substance and said juice into a a damp matted substance which coheres to itself and adheres to said surface and which, after frying, is transformed into a heat-caramelized coating that seals in the juice of said patty and is inseparable from the fried patty, the coating including at least about 30% by weight dry powdered egg whites.

10. The patty of claim 9 in which said coating includes at least about 40% by weight dry powdered egg whites.

11. The patty of claim 9 in which said coating includes about 40% to 60% by weight dry powdered egg whites.

12. The patty of claim 9 in which said coating includes about 50% by weight dry powdered egg whites.

13. The patty of claim 9 in which said coating further comprises in minor amounts cereal starch, flour, hydrogenated vegetable oil, and a granular corn meal for assisting in dusting or rubbing the coating onto the surface of the patty.

* * * * *